US009575986B2

(12) United States Patent
Doig et al.

(10) Patent No.: US 9,575,986 B2
(45) Date of Patent: Feb. 21, 2017

(54) METHOD FOR MANAGING DESIGN FILES SHARED BY MULTIPLE USERS AND SYSTEM THEREOF

(71) Applicant: Synopsys, Inc., Mountain View, CA (US)

(72) Inventors: Robert Doig, San Jose, CA (US); Jen-Feng Huang, Hsinchu, CA (US); Vincent Hsu, Hsinchu (TW); Wei-Cheng Chen, Hsinchu (TW)

(73) Assignee: Synopsys, Inc., Mountain View, CA (US)

( * ) Notice: Subject to any disclaimer, the term of this patent is extended or adjusted under 35 U.S.C. 154(b) by 576 days.

(21) Appl. No.: 13/873,604

(22) Filed: Apr. 30, 2013

(65) Prior Publication Data

US 2014/0237006 A1    Aug. 21, 2014

Related U.S. Application Data

(60) Provisional application No. 61/640,036, filed on Apr. 30, 2012.

(51) Int. Cl.
*G06F 17/30* (2006.01)
*G06F 17/50* (2006.01)

(52) U.S. Cl.
CPC ......... *G06F 17/30171* (2013.01); *G06F 17/50* (2013.01); *G06F 2217/04* (2013.01)

(58) Field of Classification Search
CPC ............... G06F 17/30194; G06F 17/30171; G06F 17/30011; G06F 17/30067; G06F 17/30203; G06F 17/30345; G06F 17/30362; G06F 17/3056; G06F 17/30206; G06F 17/30339; G06F 17/30371; G06F 17/30377; G06F 17/30224; G06F 12/00; G06F 12/0806; G06F 3/0647; G06F 11/203

USPC .............................. 707/704–780; 711/1–221
See application file for complete search history.

(56) References Cited

U.S. PATENT DOCUMENTS

| | | | | |
|---|---|---|---|---|
| 6,085,296 A | * | 7/2000 | Karkhanis | G06F 12/1009 711/147 |
| 7,698,280 B2 | * | 4/2010 | Bhat | G06Q 10/06 707/637 |
| 8,209,307 B2 | * | 6/2012 | Erofeev | G06F 17/30153 707/704 |
| 8,452,744 B2 | * | 5/2013 | Nichols | G06F 21/55 707/705 |
| 2002/0032844 A1 | * | 3/2002 | West | G06F 9/5016 711/171 |

(Continued)

*Primary Examiner* — Michelle Owyang
(74) *Attorney, Agent, or Firm* — Alston & Bird LLP

(57) ABSTRACT

A method for managing design files shared by multiple users is provided. A plurality of design files are stored in a design library. A lock table is moved to a memory of a first computer when information of the lock table indicates that the design files were locked by a first process corresponding to a first user, wherein the memory is only accessible to performance of the first process. The lock table is moved from the memory to a common memory of the first computer when one design file is locked by a second process corresponding to a second user. The first and second processes are being performed in the first computer. The lock table is moved from the memory to the design library when the one design file is locked by the second process corresponding to the second user, wherein the second process is performed in a second computer.

23 Claims, 6 Drawing Sheets

(56) References Cited

U.S. PATENT DOCUMENTS

| | | | |
|---|---|---|---|
| 2004/0103099 A1* | 5/2004 | Minagawa | G06F 17/30194 |
| 2006/0090042 A1* | 4/2006 | Nakatani | G06F 3/061 |
| | | | 711/147 |
| 2011/0131193 A1* | 6/2011 | Pasupuleti | G06F 17/30359 |
| | | | 707/704 |
| 2011/0225373 A1* | 9/2011 | Ito | G06F 12/0815 |
| | | | 711/145 |
| 2013/0275680 A1* | 10/2013 | Ikegaya | G06F 3/0608 |
| | | | 711/118 |

* cited by examiner

METHOD FOR MANAGING DESIGN FILES SHARED BY MULTIPLE USERS AND SYSTEM THEREOF

CROSS-REFERENCES TO RELATED APPLICATIONS

This application claims priority to and the benefit of U.S. Provisional Application No. 61/640,036 filed Apr. 30, 2012, the entirety of which is incorporated by reference herein.

BACKGROUND OF THE INVENTION

Field of the Invention

The disclosure relates generally to a method for sharing a plurality of design files, and more particularly, to a method for managing concurrent access to a plurality of design files shared by multiple users.

Description of the Related Art

A hierarchical design approach is used to partition a complex design into a plurality of smaller design units for an integrated circuit (IC). Furthermore, the design units are organized into a design hierarchy. A design unit is typically called a "cell" (or more specifically a "cell view"). A design hierarchy starts with a top cell, which is the root of the hierarchy. The top cell comprises a plurality of instances of cells, wherein each smaller cell may comprise a plurality of instances of smaller cells. The hierarchy can "go down" for as many levels as needed.

Cells of an IC design are stored in one or multiple design libraries. The contents of a cell (or a cell view) are typically saved in a disk file. A design library is typically implemented as a "folder" (or "directory") on the disk, and the design files are stored in the library folder or subfolders. Multiple users may concurrently work on the cells in a library. To ensure data integrity, a cell needs to be "locked" when the cell is being edited by a user; thus, other users cannot edit the cell until the cell is unlocked. Traditionally, to lock a cell is achieved by creating a lock file and placing an exclusive lock on the lock file. Therefore, the presence of a lock file plus the exclusive lock placed on it tells the world that the cell is being modified, and other programs attempting to modify the cell shall wait until the lock is dropped and the lock file deleted. If the lock file is present but the exclusive lock on it is gone already, it means the lock holder program has terminated abnormally—for example, the lock holder program didn't get a chance to remove the locks and delete the lock files properly. Logically, subsequent user programs attempting to lock the cell should implement routines to do the clean-up work for the abnormally terminated program. After the clean-up, the locking protocol can continue. This scheme works fine except for the performance overhead. That is, when there is only one user accessing the cells during the entire editing session, the overhead of creating and deleting locks files and creating and deleting exclusive locks may be too much. What is needed is a new locking scheme that does as little as possible until another user comes in asking for accessing cells concurrently.

Accordingly, what is desired are improved methods and apparatus for solving some of the problems discussed above and/or herein. Additionally, what is desired are improved methods and apparatus for reducing some of the drawbacks discussed above and/or herein.

BRIEF SUMMARY OF THE INVENTION

A computer implemented method for managing design files shared by multiple users and a system thereof are provided. In an embodiment of a computer implemented method for managing design files shared by multiple users, a plurality of design files are stored in a design library. A lock table is provided, wherein each entry of the lock table comprises information regarding which design files are locked for editing. The lock table is present initially in the memory of a first computer when the information indicates that the design files are locked by a first process corresponding to a first user, wherein the first process is performed in the first computer, and the first memory is only accessible to the first process. The lock table is moved from the memory of the first computer to a common memory of the first computer when one of the design files is to be locked by a second process corresponding to a second user, wherein the first and second processes are being performed in the first computer, and the common memory is accessible to both the first and second processes. The lock table is moved from the memory of the first computer to the disk where design library resides when one of the design files is to be locked by a third process corresponding to a third user, wherein the third process is performed in a second computer. The design library is accessible to the first and second computers.

Furthermore, an embodiment of a system for managing design files shared by multiple users is provided. The system comprises a server and a first computer. The server comprises a design library for storing a plurality of design files, a master lock file and a process identification file. The first computer executes a first process for a first user and a second process for a second user. The first computer comprises a private memory space accessible to first process only and a common memory space accessible to both first and second processes. The private memory space contains a lock table when the design files are locked only by the first process, wherein each entry of the lock table comprises information regarding which design file is locked for editing. The lock table is moved from the private memory space to the common memory space when one of the design files is to be locked by the second process.

Furthermore, another embodiment of a system for managing design files shared by multiple users is provided. The system comprises a server, a first computer and a second computer. The server comprises a design library for storing a plurality of design files, a master lock file and a process identification file. The first computer executes a first process for a first user, and comprises a private memory space accessible to the first process only. The private memory space contains a lock table when the design files are locked only by the first process, wherein each entry of the lock table comprises information regarding which design file is locked for editing. The lock table is moved from the private memory space to the common memory when one of the design files is locked. The memory is only accessible to performance of the first process.

In various embodiments, a computer implemented method is provided for managing design files shared by multiple processes. A plurality of design files are stored in a design library accessible to each of a plurality of computers. A lock table is created wherein each entry of the lock table comprises information regarding which design file stored in the design library is locked by which process. The lock table is created in a process memory of a first process in a first computer in the plurality of computers when the information indicates that the design files in the design library are accessed only by the first process in the first computer. The lock table is moved from the process memory of the first process to a common memory in the first computer in response to information indicating that one of the design files in the design library is to be locked by a second process of the first computer. The common memory is accessible to both the first and second processes. The lock table is moved from a predetermined memory in the first computer to the design library in response to information indicating that one of the design files in the design library is to be locked by a process in a different computer in the plurality of computers.

Moving the lock table from the process memory of the first process in the first computer to the common memory in the first computer may include moving the lock table to the common memory of the first computer by the first process in response to a message sent to the first process by the second process. Moving the lock table from the predetermined memory in the first computer to the design library may include moving the lock table to the design library by the first process in response to a message sent to the first process of the first computer by the process of the different computer in the plurality of computers.

In one aspect, a master lock file is locked in the design library prior to each of one or more processes accessing the design library. A process identification file is then created and locked in the design library for each of the one or more processes. The process identification file may include information regarding a unique number assigned to the process, a user name associated with the process, a machine name in which the process resides, a socket port number that the process uses, and a process id assigned by an operating system of the process. A determination is made whether to move the lock table from the process memory of the first process or the common memory in the first computer according to the process identification files in the design library. The corresponding process identification file may be unlocked and deleted in response to information indicating one of the first and second processes finishes editing the corresponding locked design files in the design library or when one of the first and second processes is dead. The corresponding locked design files is then unlocked in the design library based on deleting the corresponding process identification file. The master lock file is also unlocked. In some aspects, a set of corresponding entries are removed in the lock table based on unlocking the corresponding locked design files in the design library.

In further aspects, the lock table is moved from the common memory in the first computer to the process memory of the first process based on the second process in the first computer unlocking all used design files in the design library. The lock table may be moved from the design library to the memory of the first computer based on the process in the different computer in the plurality of computers unlocking all used design files in the design library.

In one embodiment, the lock table is copied from the common memory in the first computer or from the design library to the process memory of active processes as a local cache of the lock table. In some aspects, a determination is made whether a last modified time of the lock table in the common memory of the first computer is identical to a last modified time of the local cache of the lock table in the process memory of the second process. The lock table in the common memory of the first computer may be copied to the process memory of the second process when a last modified time of the lock table in the common memory of the first computer is different from the last modified time of the local cache of the lock table in the process memory of the second process. The one of the design files may be locked and edited by the second process with a new entry added into the local cache of the lock table in the process memory of the second process. The local cache of the lock table may be copied with the new entry from the process memory of the second process to the common memory of the first computer as the lock table.

In another aspect, a determination may be made whether a last modified time of the lock table in the common memory of the first computer is identical to a last modified time of the local cache of the lock table in the process memory of the second process. The lock table in the common memory of the first computer may be copied to the process memory of the second process when the last modified time of the lock table is different from the last modified time of the local cache of the lock table in the process memory of the second process. The one of the design files may be unlocked by the second process and one or more entries removed from the local cache of the lock table in the process memory of the second process. The lock table is then updated in the common memory according to the local cache of the lock table in the process memory of the second process without the one or more removed entries.

In yet another aspect, a determination is made whether a last modified time of the lock table in the design library is identical to a last modified time of a local cache of the lock table in the process memory of the second process. The lock table in the design library may be copied to the process memory of the second process when the last modified time of the lock table in the design library is different from the last modified time of the local cache of the lock table in the process memory of the second process. The one of the design files may be locked and edited by the second process and a new entry added into the local cache of the lock table in the process memory of the second process. The local cache of the lock table is then copied with the new entry from the process memory of the second process to the design library as the lock table.

In a still further aspect, a determination is made whether a last modified time of the lock table in the design library is identical to a last modified time of a local cache of the lock table in the process memory of the second process. The lock table in the design library may be copied to the process memory of the second process when the last modified time of the lock table in the design library is different from the last modified time of the cache of the local lock table in the process memory of the second process. The one of the design files may be unlocked by the second process and one or more entries removed from the local cache of the lock table in the process memory of the second process. The lock table in the design library is then updated according to the local cache of the lock table in the process memory of the second process without the one or more removed entries.

In one embodiment, a non-transitory computer-readable medium stores computer-executable code for managing design files shared by multiple processes. the non-transitory computer-readable medium includes code for creating a lock table, wherein each entry of the lock table comprises information regarding which design file in a plurality of design files stored in a design library accessible to each of a plurality of computers is locked by which process, wherein the lock table is created in a process memory of a first process in a first computer in the plurality of computers when the information indicates that the design files in the design library are accessed only by the first process in the first computer, code for moving the lock table from the process memory of the first process to a common memory in the first computer in response to information indicating that one of the design files in the design library is to be locked by a second process of the first computer, the common memory accessible to both the first and second processes, and code for moving the lock table from a predetermined memory in the first computer to the design library in response to information indicating that one of the design files in the design library is to be locked by a process in a different computer in the plurality of computers.

In one embodiment, a system for managing design files shared by multiple processes includes a processor and a memory storing a set of instructions which when execute by the processor configured the processor to create a lock table, wherein each entry of the lock table comprises information regarding which design file of a plurality of design files stored in a design library accessible to each of a plurality of computers is locked by which process, wherein the lock table is created in a process memory of a first process in a first computer in the plurality of computers when the information indicates that the design files in the design library are accessed only by the first process in the first computer, move the lock table from the process memory of the first process to a common memory in the first computer in response to information indicating that one of the design files in the design library is to be locked by a second process of the first computer, the common memory accessible to both the first and second processes, and move the lock table from a predetermined memory in the first computer to the design library in response to information indicating that one of the design files in the design library is to be locked by a process in a different computer in the plurality of computers.

A further understanding of the nature and the advantages of the inventions disclosed herein may be realized by reference of the remaining portions of the specification and the attached drawings.

BRIEF DESCRIPTION OF THE DRAWINGS

In order to better describe and illustrate embodiments and/or examples of those inventions disclosed herein, reference may be made to one or more accompanying drawings. The additional details or examples used to describe the accompanying drawings should not be considered as limitations to the scope of any of the disclosed inventions, the presently described embodiments and/or examples, and the presently understood best mode of these inventions.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
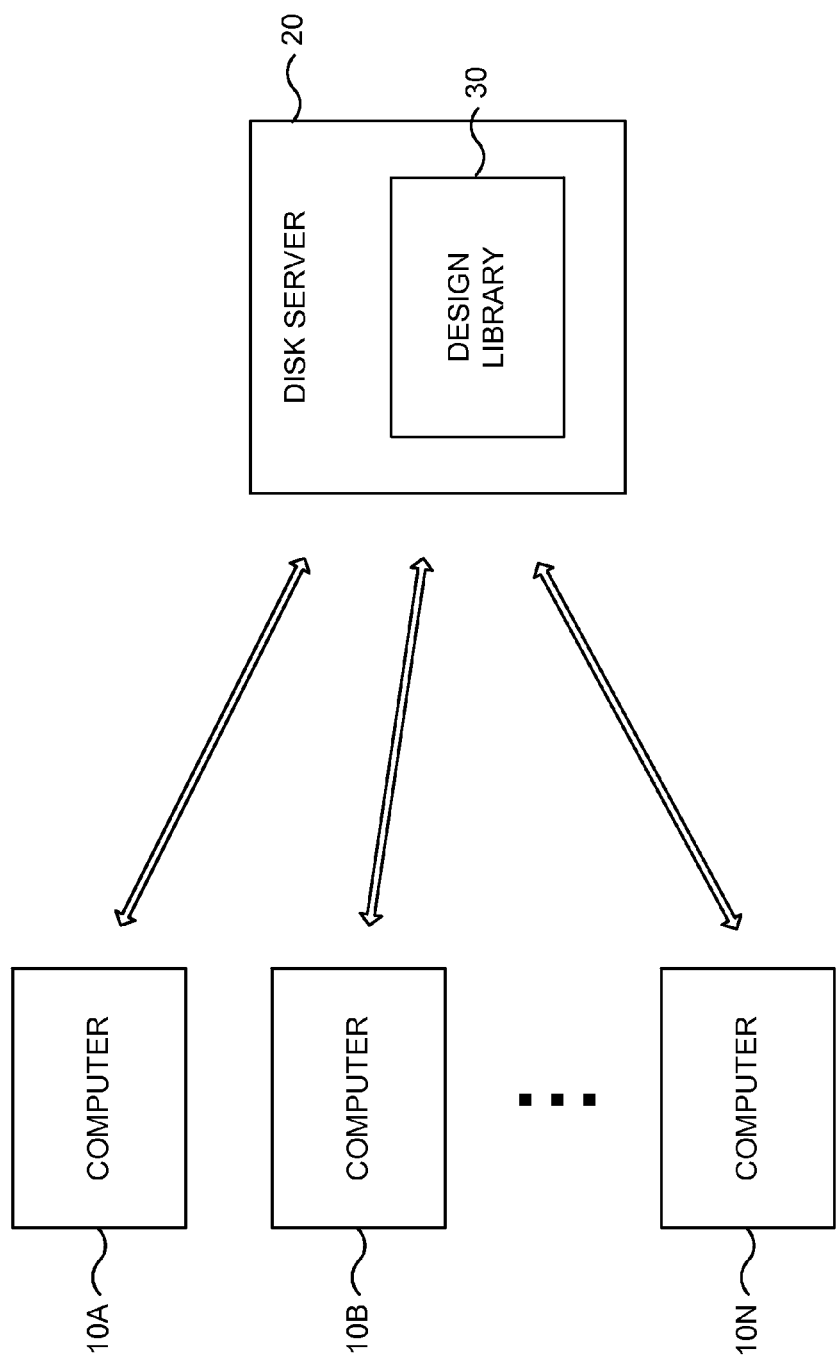
FIG. 1 shows a system for managing design files shared by multiple users according to an embodiment of the invention.

FIG. 1 shows a system 100 for managing design files shared by multiple users according to an embodiment of the invention. The system 100 comprises a plurality of computers 10A-10N and a disk server 20. The disk server 20 comprises a design library 30, wherein the design library 30 is used to store at least one IC design formed by a plurality of design files. Various users can use the computers 10A-10N to access the design library 30 for editing the design files. For example, a first user can perform a first process via the computer 10A to edit a first design file of the design library 30, and a second user can perform a second process via the computer 10B to edit a second design file of the design library 30. Furthermore, the design library 30 further comprises a master lock file. In one embodiment, the design library 30 may be configured in one of the computers 10A-10N. Furthermore, when a user stops accessing the design library 30, a process corresponding to the user will inform the remaining users about changes of states thereof if needed.

Figure 2:
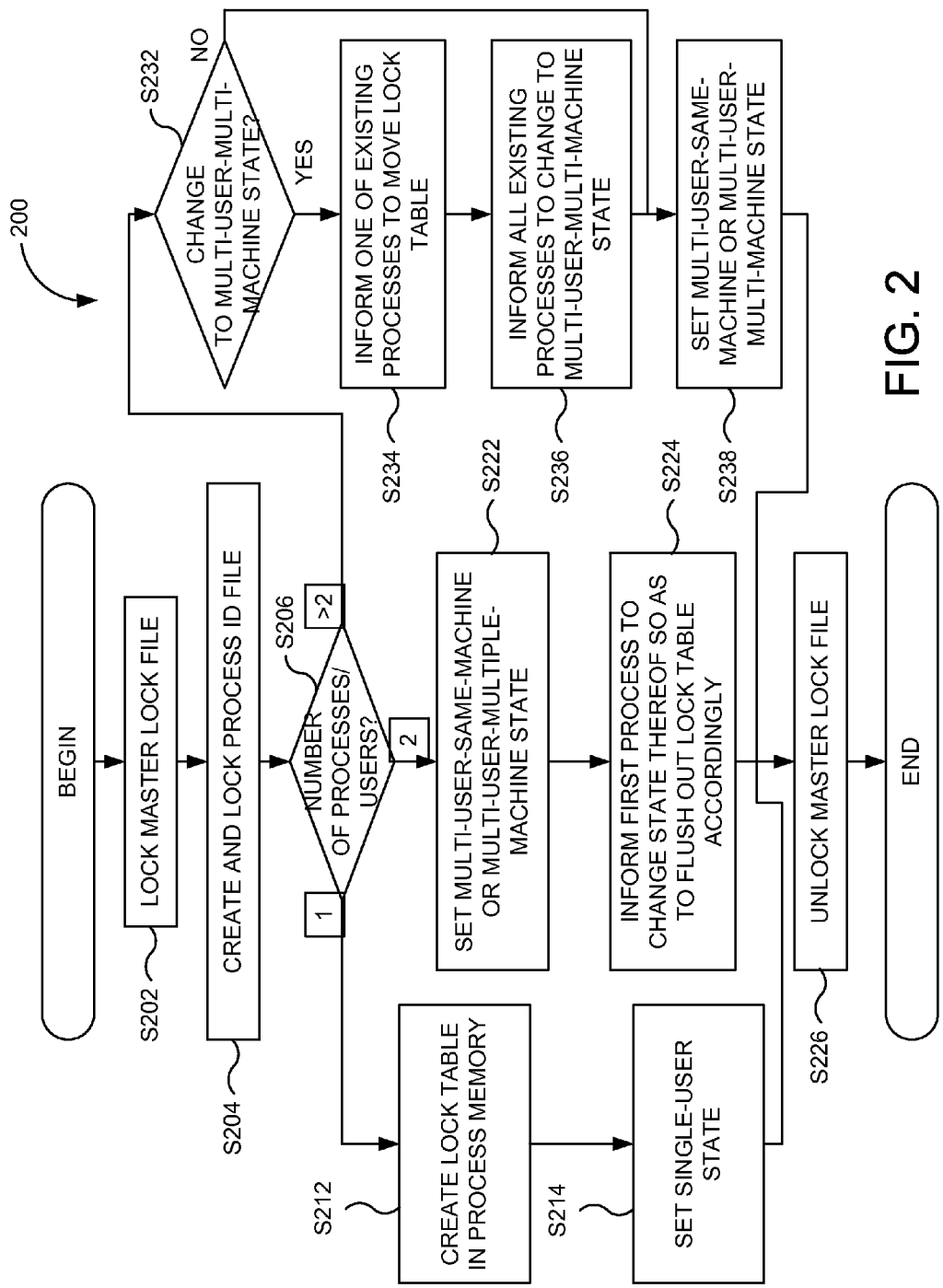
FIG. 2 shows a computer implemented method for managing a plurality of design files shared by multiple users according to an embodiment of the invention, wherein steps to start accessing a design library are illustrated.

FIG. 2 shows a computer implemented method 200 for managing a plurality of design files shared by multiple users according to an embodiment of the invention, wherein the design files are stored in a design library of a server (e.g. design library 30 of disk server 20 of FIG. 1). Implementations of or processing in method 200 depicted in FIG. 2 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. In FIG. 2, the steps to start the accessing of a design library are illustrated, wherein a user performs one or more processes via a computer (e.g. 10A-10N of FIG. 1).

First, in step S202, a master lock file of the design library is locked by a process performed by a user. In one embodiment, the master lock file is an empty file in the design library 30. Additionally, an exclusive lock (e.g. flock( )) may be placed on the master lock file before any process can access any files of the design library 30. Next, in step S204, a process identification (ID) file corresponding to the process is created and then is locked in a processes directory under the design library 30. In one embodiment, the process ID file is empty as created, and the file name of the process ID file comprises information pertaining to a "process number", "user name", "machine name", "socket port number" and "OS pid". The "process number" as used herein is a unique number assigned to the process that is requesting to access the design files in the design library 30. The "machine name" as used herein represents the computer or device to which process is related or on which the process is performed. The "socket port number" as used herein represents a communication connection between a computer and other computers, such as a TCP/IP socket for transmitting messages to other processes or receiving messages from other processes. The "OS pid" as used herein is a process identifier assigned by an operating system. For example, a process ID file may be named as L2@user1@mymachine@12345@4456, where L2 represents "process number", user1 represents "user name", mymachine represents "machine name", 12345 represents "socket port number", and 4456 represents "OS pid".

Next, by counting all of the process ID files in the design library, the number of users is determined (step S206). For example, if there are no other process ID files in the design library 30 except the current one being created, a determination can be made that only the user of the process attempts to access the design library, and a lock table is created in the memory of the process in the computer (step S212). In some embodiments, the memory is only accessible to the process. Next, in step S214, a single-user state is set for the process. After the state of the process is set, the master lock file of the design library is unlocked by the process (step S226).

In step S206 of FIG. 2, if there is only one existing process ID file in the design library, it is determined that the process that attempts to access the design library is a second user. Furthermore, it is further determined whether the first process and the second process are in the same computer. If the first and second processes are in the same computer, a multi-user-same-machine state is set (step S222). Next, the second process sends a message to inform the first process to change the state, and the first process changes the state from a single-user state to a multi-user-same-machine state in response to the message from the second process (step S224). Then, the first process moves the lock table from its memory to a common memory of the computer (such as a ramdisk), and sends an acknowledgement (ACK) to the second process.

Figure 3:
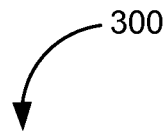
FIG. 3 shows a lock table according to an embodiment of the invention.

In the design library 30, a "common memory directory name" file is created when the lock table is moved to the common memory of the computer so as to record the location of the lock table. The common memory is accessible to both the first and second processes, thereby the second process can add a new entry into the lock table, as shown in lock table 300 of FIG. 3. In FIG. 3, each entry of the lock table comprises information regarding which design files are locked by which processes.

If the first and second processes are in different computers (e.g. 10A and 10B of FIG. 1), a multi-user-multi-machine state is set (step S222). Next, the second process sends a message to inform the first process to change the state, and the first process changes the state from a single-user state to a multi-user-multi-machine state in response to the message from the second process (step S224). Then, the first process moves the lock table from its private memory to the design library and sends the ACK to the second process. After receiving the ACK, the master lock file of the design library is unlocked by the second process (step S226).

Referring back to step S206, if the process ID files indicate that the design library is being accessed by at least two processes, it is determined that the process that is attempting to access the design library is a third user (or beyond), and the process is referred to as the third process. Then, in step S232, it is further determined whether all the processes are in the same computer. If all the processes are in the same computer, a multi-user-same-machine state is also set for the third process (step S238). Otherwise, if the at least two processes are in different computers already (i.e. the first and second processes are in a multi-user-multi-machine state), a multi-user-multi-machine state is also set for the third process (step S238).

If the at least two processes are in the same computer that is different from the computer that the third process is in, the third process sends a message to inform the first or second process to move the lock table stored in a common memory of their computer to the design library (step S234). Next, the third process informs all existing processes about changes of states thereof from a multi-user-same-machine state to a multi-user-multi-machine state (step S236). Next, a multi-user-multi-machine state is set for the third process (step S238). After the state of the third process is set, the master lock file of the design library is unlocked by the third process (step S226).

Figure 4:
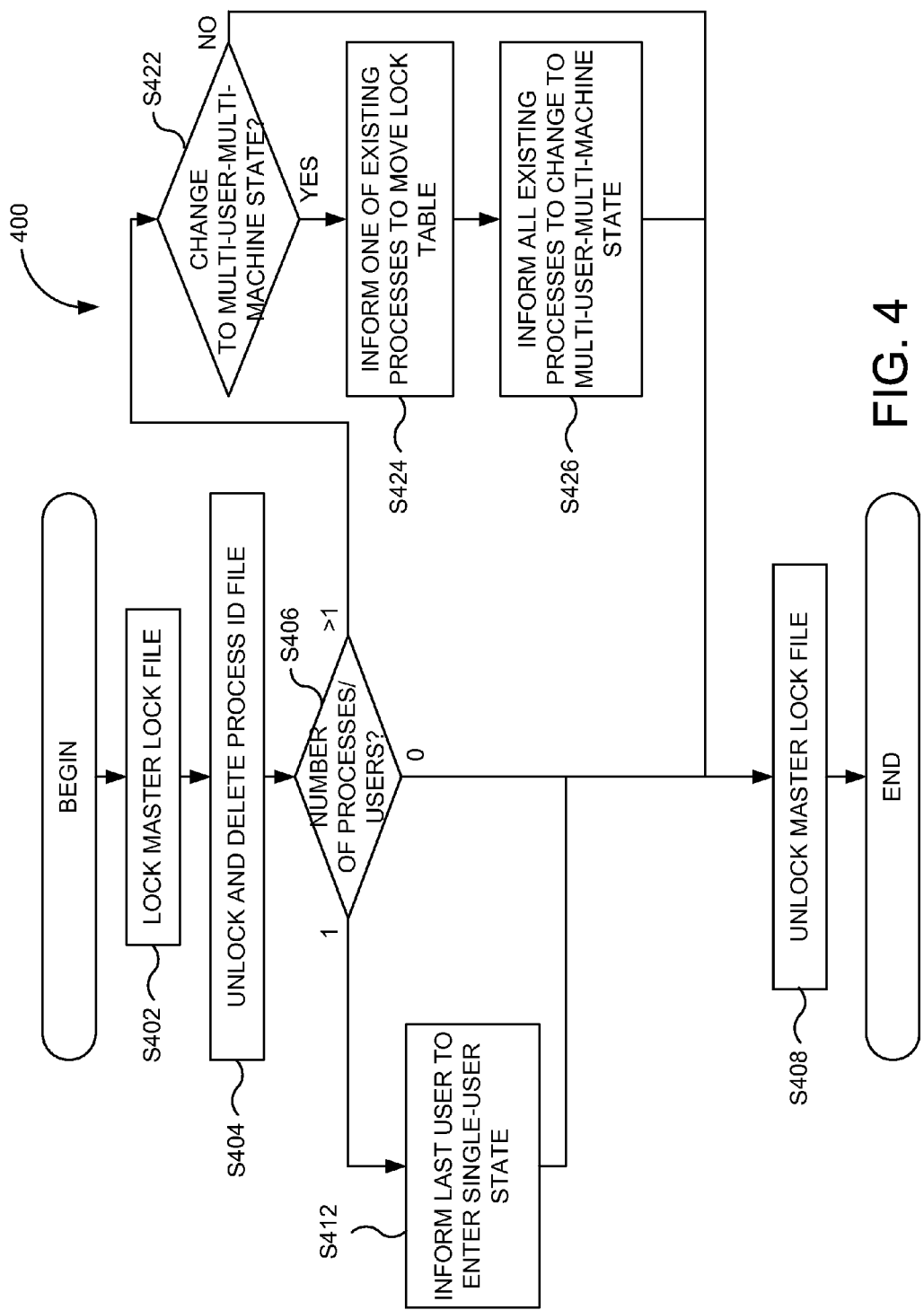
FIG. 4 shows a computer implemented method for managing a plurality of design files shared by multiple users according to another embodiment of the invention, wherein steps to stop accessing a design library are illustrated.

FIG. 4 shows a computer implemented method 400 for managing a plurality of design files shared by multiple users according to another embodiment of the invention, wherein the design files are stored in a design library of a server (e.g. 20 of FIG. 1). Implementations of or processing in method 400 depicted in FIG. 4 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. In FIG. 4, the steps to stop the accessing of a design library are illustrated, wherein a user performs one or more processes via a computer (e.g. 10A-10N of FIG. 1).

First, in step S402, the master lock file of the design library is locked by the process. Next, in step S404, the process ID file corresponding to the process is unlocked and deleted in the process directory under the design library, wherein the process ID file was created and locked when the process first attempted to access the design library, as shown in step S204 of FIG. 2. Furthermore, all entries related to the process are removed from the lock table.

Next, according to the remaining process ID files of the design library, the number of remaining users is determined (step S406). If no process ID file exists in the design library, i.e. all process ID files are deleted, then the master lock file is unlocked (step S408). If the remaining process ID files indicate that only one process remaining, the process sends a message to inform the remaining process to change the state to a single-user state (step S412) and move the lock table to its private memory. After the lock table is moved, the master lock file is unlocked (step S408).

If the remaining process ID files indicate that there are more than one process remaining, it is further determined whether the processes are in the same computer (step S422). If the processes corresponding to the remaining process ID files are in different computers, the state remains in multi-user-multi-machine state and the master lock file is unlocked (step S408). If the processes corresponding to the remaining process ID files are in the same computer but are different from the process that is stopping the access to the design library, the process sends a message to inform one of the remaining processes to move the lock table from the design library to a common memory of the computer that the processes corresponding to the remaining process ID files are in (step S424). Next, the process sends a message to inform the processes corresponding to the remaining process ID files to change the state to a multi-user-same-machine state (step S426). After multi-user-same-machine state is set, the master lock file is unlocked (step S408).

Figure 5:
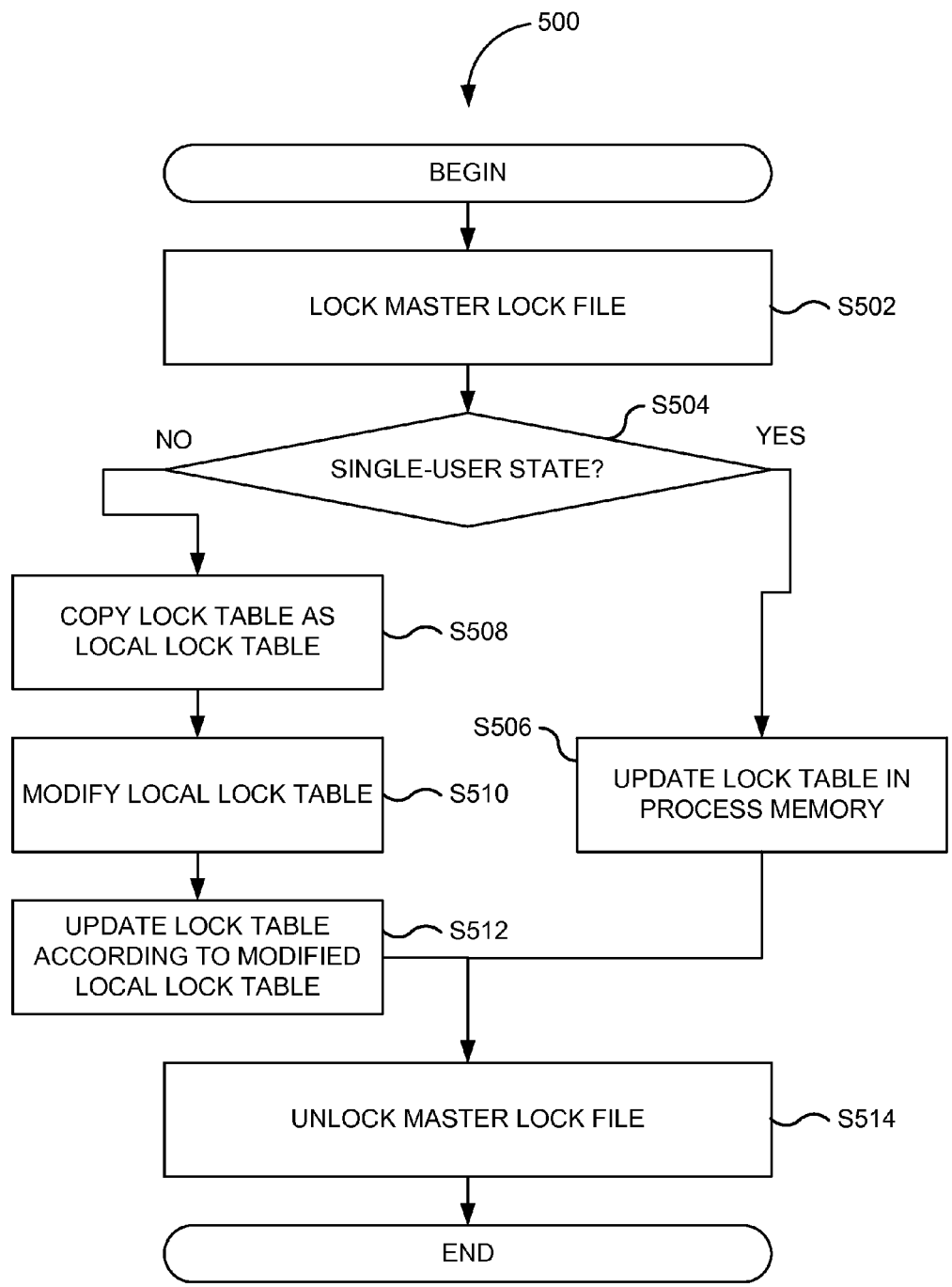
FIG. 5 shows a computer implemented method for managing a plurality of design files shared by multiple users according to another embodiment of the invention, wherein steps to lock/unlock a design file of a design library are illustrated.

FIG. 5 shows a computer implemented method 500 for managing a plurality of design files shared by multiple users according to another embodiment of the invention, wherein the design files are stored in a design library of a server (e.g. design library 30 of disk server 20 of FIG. 1). Implementations of or processing in method 500 depicted in FIG. 5 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. In FIG. 5, the steps to lock/unlock a design file of a design library are illustrated, wherein the process performs the steps via a computer (e.g. 10A-10N of FIG. 1).

First, in step S502, the master lock file of the design library is locked by the process. Next, it is determined whether the process is in a single-user state (step S504). If the process is in a single user state, the lock table is in the process private memory, and the process can directly update the lock table by adding a new entry into the lock table when locking a design file or removing the entry from the lock table when unlocking a design file (step S506), wherein each entry of the lock table comprises information regarding the locked design file and the process that has that design file locked. After the lock table is updated, the master lock file is unlocked (step S514).

If the process is in a multi-user-same-machine state or a multi-user-multi-machine state, a refresh procedure is needed when the "last modified time" of the local lock table is older than the "last modified time" of the lock table. To refresh, the process copies the lock table disposed in a common memory (a multi-user-same-machine state) or the design library (a multi-user-multi-machine state) to its memory thereof as a local lock table (step S508). Next, the process modifies the local lock table by adding a new entry into the local lock table when locking a design file or removing an entry from the local lock table when unlocking a design file (step S510). Next, in step S512, the modified local lock table is copied to the common memory (a multi-user-same-machine state) or the design library (a multi-user-multi-machine state) so as to update the lock table. After the lock table is updated, the master lock file is unlocked (step S514).

In one embodiment, one process can use inter process communication (IPC) technology to inform the other processes to change the state thereof. For example, each program can use a socket to receive messages from the other processes. The machine name and the port number are included as part of the file name of the process ID file. The machine name can be translated into the IP address, which, combining with the port number, can be used for socket connection. Furthermore, a socket I/O is operated in a dedicated thread which is called a socket thread. The socket thread and other threads in the process may access the locked files concurrently. Therefore, a semaphore is needed to allow only one thread at a time to access the shared data. Take exiting a single user state as an example. First, a semaphore is acquired. Next, the lock table is moved to the common memory (in a multi-user-same-machine state) or the design library (in a multi-user-multi-machine state). Next, the state of the process is set to a multi-user-same-machine state or a multi-user-multi-machine state. After the state of the process is set, the semaphore is released. Moreover, to take entering a single user state as an example, first, a semaphore is acquired. Next, the lock table is copied from the common memory or the library directory to the processes' private memory as the local lock table. Next, the lock table is deleted. Next, the state of the process is set to a single-user state. After the state of the process is set, the semaphore is released.

Before sending a message to "exit single user state" or "enter single user state", it is needed to check whether the process that receives the message is still running. Moreover, when a locked file can not be granted, it is also needed to determine whether the process that locks the file is still running. If the process is not running (dead), the entries of the lock table corresponding to the dead process can be removed, and the process ID file corresponding to the dead process is can also be deleted.

Figure 6:
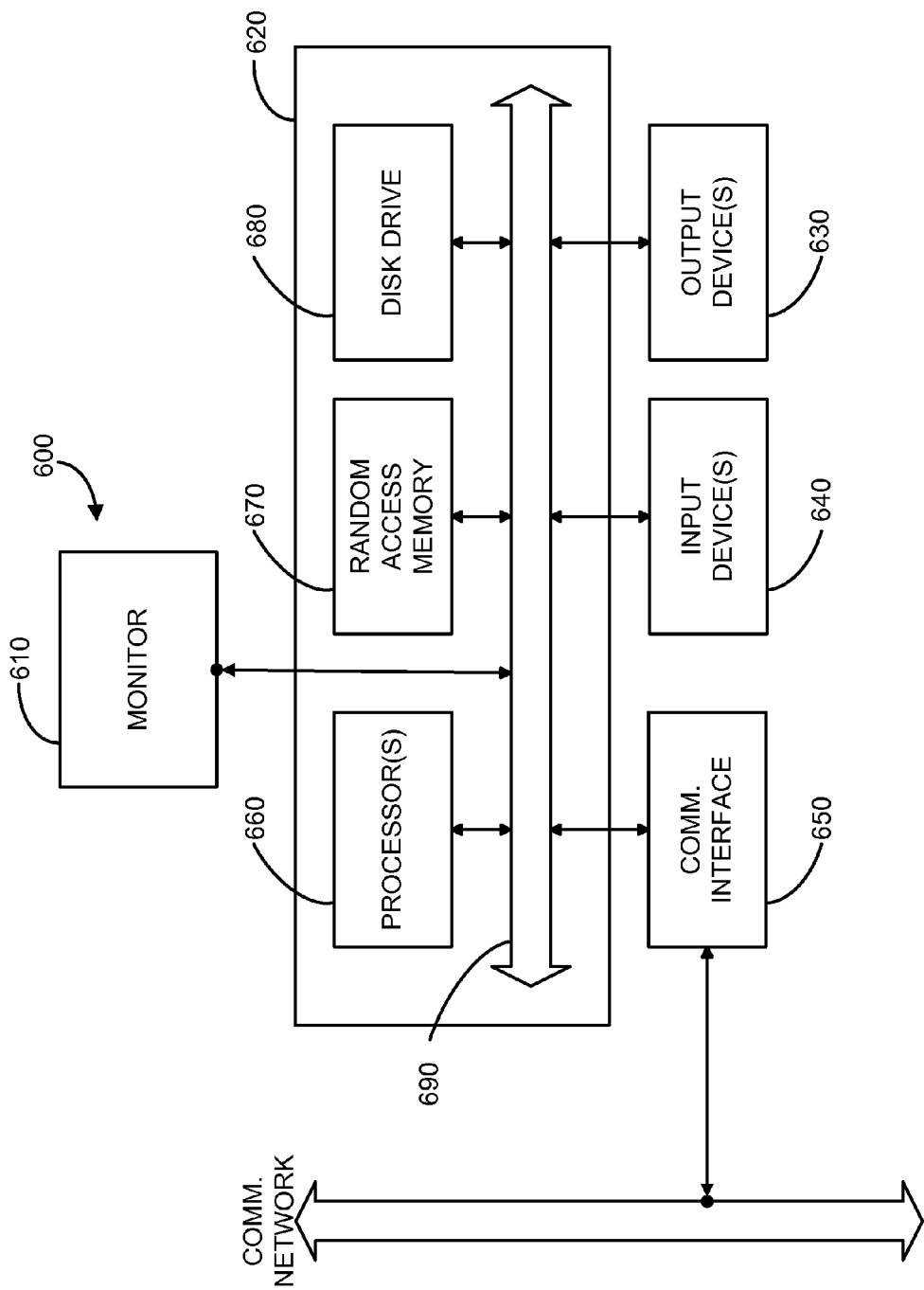
FIG. 6 is a simplified block diagram of a computer system that may incorporate embodiments of the present invention.

FIG. 6 is a simplified block diagram of a computer system that may incorporate embodiments of the present invention. FIG. 6 is merely illustrative of an embodiment incorporating the present invention and does not limit the scope of the invention as recited in the claims. One of ordinary skill in the art would recognize other variations, modifications, and alternatives.

In one embodiment, computer system 600 typically includes a monitor 610, a computer 620, user output devices 630, user input devices 640, communications interface 650, and the like.

As shown in FIG. 6, computer 620 may include a processor(s) 660 that communicates with a number of peripheral devices via a bus subsystem 690. These peripheral devices may include user output devices 630, user input devices 640, communications interface 650, and a storage subsystem, such as random access memory (RAM) 670 and disk drive 680.

User input devices 630 include all possible types of devices and mechanisms for inputting information to computer system 620. These may include a keyboard, a keypad, a touch screen incorporated into the display, audio input devices such as voice recognition systems, microphones, and other types of input devices. In various embodiments, user input devices 630 are typically embodied as a computer mouse, a trackball, a track pad, a joystick, wireless remote, drawing tablet, voice command system, eye tracking system, and the like. User input devices 630 typically allow a user to select objects, icons, text and the like that appear on the monitor 610 via a command such as a click of a button or the like.

User output devices 640 include all possible types of devices and mechanisms for outputting information from computer 620. These may include a display (e.g., monitor 610), non-visual displays such as audio output devices, etc.

Communications interface 650 provides an interface to other communication networks and devices. Communications interface 650 may serve as an interface for receiving data from and transmitting data to other systems. Embodiments of communications interface 650 typically include an Ethernet card, a modem (telephone, satellite, cable, ISDN), (asynchronous) digital subscriber line (DSL) unit, FireWire interface, USB interface, and the like. For example, communications interface 650 may be coupled to a computer network, to a FireWire bus, or the like. In other embodiments, communications interfaces 650 may be physically integrated on the motherboard of computer 620, and may be a software program, such as soft DSL, or the like.

In various embodiments, computer system 600 may also include software that enables communications over a network such as the HTTP, TCP/IP, RTP/RTSP protocols, and the like. In alternative embodiments of the present invention, other communications software and transfer protocols may also be used, for example IPX, UDP or the like.

In some embodiment, computer 620 includes one or more Xeon microprocessors from Intel as processor(s) 660. Further, one embodiment, computer 620 includes a UNIX-based operating system.

RAM 670 and disk drive 680 are examples of tangible media configured to store data such as embodiments of the present invention, including executable computer code, human readable code, or the like. Other types of tangible media include floppy disks, removable hard disks, optical storage media such as CD-ROMS, DVDs and bar codes, semiconductor memories such as flash memories, read-onlymemories (ROMS), battery-backed volatile memories, networked storage devices, and the like. RAM 670 and disk drive 680 may be configured to store the basic programming and data constructs that provide the functionality of the present invention.

Software code modules and instructions that provide the functionality of the present invention may be stored in RAM 670 and disk drive 680. These software modules may be executed by processor(s) 660. RAM 670 and disk drive 680 may also provide a repository for storing data used in accordance with the present invention.

RAM 670 and disk drive 680 may include a number of memories including a main random access memory (RAM) for storage of instructions and data during program execution and a read only memory (ROM) in which fixed instructions are stored. RAM 670 and disk drive 680 may include a file storage subsystem providing persistent (non-volatile) storage for program and data files. RAM 670 and disk drive 680 may also include removable storage systems, such as removable flash memory.

Bus subsystem 690 provides a mechanism for letting the various components and subsystems of computer 620 communicate with each other as intended. Although bus subsystem 690 is shown schematically as a single bus, alternative embodiments of the bus subsystem may utilize multiple busses.

FIG. 6 is representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other micro processors are contemplated, such as Pentium™ or Itanium™ microprocessors; Opteron™ or AthlonXP™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

Various embodiments of the present invention can be implemented in the form of logic in software or hardware or a combination of both. The logic may be stored in a computer readable or machine-readable storage medium as a set of instructions adapted to direct a processor of a computer system to perform a set of steps disclosed in embodiments of the present invention. The logic may form part of a computer program product adapted to direct an information-processing device to perform a set of steps disclosed in embodiments of the present invention. Based on the disclosure and teachings provided herein, a person of ordinary skill in the art will appreciate other ways and/or methods to implement the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims. In addition, the technique and system of the present invention is suitable for use with a wide variety of EDA tools and methodologies for designing, testing, and/or manufacturing integrated circuits or other electronic devices. The scope of the invention should, therefore, be determined not with reference to the above description, but instead should be determined with reference to the pending claims along with their full scope or equivalents.

What is claimed is:

1. A computer implemented method for managing design files, the method comprising:

storing a plurality of design files of an integrated circuit, shared by multiple processes of a plurality of computers, in a design library of a server accessible to each of the plurality of computers, wherein each of the plurality of design files represents a portion of a design of the integrated circuit;

creating a lock table with one or more processors associated with one or more computers in the plurality of computers, wherein each entry of the lock table comprises information regarding which design file stored in the design library is locked by which process, wherein the lock table is created in a process memory of a first process in a first computer in the plurality of computers when the information indicates that the design files in the design library are accessed only by the first process in the first computer;

moving, with the one or more processors associated with the one or more computers in the plurality of computers, the lock table from the process memory of the first process to a common memory in the first computer in response to (i) information indicating that one of the design files in the design library is to be locked by a second process of the first computer, the common memory accessible to both the first and second processes, and (ii) determining that the design files in the design library are being accessed by the first and second processes in the first computer; and moving, with the one or more processors associated with the one or more computers in the plurality of computers, the lock table from the process memory of the first process in the first computer to the design library in response to (i) information indicating that one of the design files in the design library is to be locked by a process in a second computer different than the first computer and (ii) determining that the design files in the design library are being accessed by the first process in the first computer and the process in the second computer.

2. The method of claim 1, wherein moving, with the one or more processors associated with the one or more computers in the plurality of computers, the lock table from the process memory of the first process in the first computer to the common memory in the first computer comprises moving the lock table to the common memory of the first computer by the first process in response to a message sent to the first process by the second process.

3. The method of claim 1, wherein moving, with the one or more processors associated with the one or more computers in the plurality of computers, the lock table from the process memory in the first computer to the design library comprises moving the lock table to the design library by the first process in response to a message sent to the first process of the first computer by the process in the second computer in the plurality of computers.

4. The method of claim 1, further comprising:

locking a master lock file in the design library prior to each of one or more processes accessing the design library;

creating and locking a process identification file in the design library for each of the one or more processes, the process identification file comprising information regarding a unique number assigned to the process, a user name associated with the process, a machine name in which the process resides, a socket port number that the process uses, and a process id assigned by an operating system of the process; and moving the lock table from the process memory of the first process or the common memory in response to determining that at least two processes in the first or second computer are different from a third process in a third computer.

5. The method of claim 4, further comprising:

unlocking and deleting the corresponding process identification file in response to information indicating one of the first and second processes finishes editing the corresponding locked design files in the design library or when one of the first and second processes is dead;

unlocking the corresponding locked design files in the design library based on deleting the corresponding process identification file; and unlocking the master lock file.

6. The method of claim 5, further comprising:

removing a set of corresponding entries in the lock table based on unlocking the corresponding locked design files in the design library.

7. The method of claim 1, further comprising:

moving, with the one or more processors associated with the one or more computers in the plurality of computers, the lock table from the common memory in the first computer to the process memory of the first process based on the second process in the first computer unlocking all used design files in the design library.

8. The method of claim 1, further comprising:

moving, with the one or more processors associated with the one or more computers in the plurality of computers, the lock table from the design library to the memory of the first computer based on the process in the second computer in the plurality of computers unlocking all used design files in the design library.

9. The method of claim 1, further comprising:

copying, with the one or more processors associated with the one or more computers in the plurality of computers, the lock table from the common memory in the first computer or from the design library to the process memory of active processes as a local cache of the lock table.

10. The method of claim 9, further comprising:

determining, with the one or more processors associated with the one or more computers in the plurality of computers, whether a last modified time of the lock table in the common memory of the first computer is identical to a last modified time of the local cache of the lock table in the process memory of the second process;

copying, with the one or more processors associated with the one or more computers in the plurality of computers, the lock table in the common memory of the first computer to the process memory of the second process when a last modified time of the lock table in the common memory of the first computer is different from the last modified time of the local cache of the lock table in the process memory of the second process;

locking and editing the one of the design files by the second process and adding, with the one or more processors associated with the one or more computers in the plurality of computers, a new entry into the local cache of the lock table in the process memory of the second process;

copying, with the one or more processors associated with the one or more computers in the plurality of computers, the local cache of the lock table with the new entry from the process memory of the second process to the common memory of the first computer as the lock table.

11. The method of claim 9, further comprising:

determining, with the one or more processors associated with the one or more computers in the plurality of computers, whether a last modified time of the lock table in the common memory of the first computer is identical to a last modified time of the local cache of the lock table in the process memory of the second process;

copying, with the one or more processors associated with the one or more computers in the plurality of computers, the lock table in the common memory of the first computer to the process memory of the second process when the last modified time of the lock table is different from the last modified time of the local cache of the lock table in the process memory of the second process;

unlocking the one of the design files by the second process and removing, with the one or more processors associated with the one or more computers in the plurality of computers, one or more entries from the local cache of the lock table in the process memory of the second process; and updating, with the one or more processors associated with the one or more computers in the plurality of computers, the lock table in the common memory according to the local cache of the lock table in the process memory of the second process without the one or more removed entries.

12. The method of claim 9, further comprising:

determining, with the one or more processors associated with the one or more computers in the plurality of computers, whether a last modified time of the lock table in the design library is identical to a last modified time of a local cache of the lock table in the process memory of the second process;

copying, with the one or more processors associated with the one or more computers in the plurality of computers, the lock table in the design library to the process memory of the second process when the last modified time of the lock table in the design library is different from the last modified time of the local cache of the lock table in the process memory of the second process;

locking and editing the one of the design files by the second process and adding, with the one or more processors associated with the one or more computers in the plurality of computers, a new entry into the local cache of the lock table in the process memory of the second process;

copying, with the one or more processors associated with the one or more computers in the plurality of computers, the local cache of the lock table with the new entry from the process memory of the second process to the design library as the lock table.

13. The method of claim 9, further comprising:

determining, with the one or more processors associated with the one or more computers in the plurality of computers, whether a last modified time of the lock table in the design library is identical to a last modified time of a local cache of the lock table in the process memory of the second process;

copying, with the one or more processors associated with the one or more computers in the plurality of computers, the lock table in the design library to the process memory of the second process when the last modified time of the lock table in the design library is different from the last modified time of the cache of the local lock table in the process memory of the second process;

unlocking the one of the design files by the second process and removing, with the one or more processors associated with the one or more computers in the plurality of computers, one or more entries from the local cache of the lock table in the process memory of the second process; and updating, with the one or more processors associated with the one or more computers in the plurality of computers, the lock table in the design library according to the local cache of the lock table in the process memory of the second process without the one or more removed entries.

14. A non-transitory computer-readable medium storing computer-executable code for managing design files, the non-transitory computer-readable medium comprising:

code for creating a lock table, wherein each entry of the lock table comprises information regarding which design file in a plurality of design files of an integrated circuit, shared by multiple processes of a plurality of computers and stored in a design library of a server accessible to each of a plurality of the computers, is locked by which process, wherein each of the plurality of design files represents a portion of a design of the integrated circuit, wherein the lock table is created in a process memory of a first process in a first computer in the plurality of computers when the information indicates that the design files in the design library are accessed only by the first process in the first computer;

code for moving the lock table from the process memory of the first process to a common memory in the first computer in response to (i) information indicating that one of the design files in the design library is to be locked by a second process of the first computer, the common memory accessible to both the first and second processes, and (ii) determining that the design files in the design library are being accessed by the first and second processes in the first computer; and code for moving the lock table from the process memory of the first process in the first computer to the design library in response to (i) information indicating that one of the design files in the design library is to be locked by a process in a second computer different than the first computer and (ii) determining that the design files in the design library are being accessed by the first process in the first computer and the process in the second computer.

15. The non-transitory computer-readable medium of claim 14, wherein the code for moving the lock table from the process memory of the first process in the first computer to the common memory in the first computer comprises code for moving the lock table to the common memory of the first computer by the first process in response to a message sent to the first process by the second process.

16. The non-transitory computer-readable medium of claim 14, wherein the code for moving the lock table from the process memory in the first computer to the design library comprises code for moving the lock table to the design library by the first process in response to a message sent to the first process of the first computer by the process in the second computer in the plurality of computers.

17. The non-transitory computer-readable medium of claim 14, further comprising:

code for locking a master lock file in the design library prior to each of one or more processes accessing the design library;

code for creating and locking a process identification file in the design library for each of the one or more processes, the process identification file comprising information regarding a unique number assigned to the process, a user name associated with the process, a machine name in which the process resides, a socket port number that the process uses, and a process id assigned by an operating system of the process; and code for moving the lock table from the process memory of the first process or the common memory in response to determining that at least two processes in the first or second computer are different from a third process in a third computer.

18. The non-transitory computer-readable medium of claim 17, further comprising:

code for unlocking and deleting the corresponding process identification file in response to information indicating one of the first and second processes finishes editing the corresponding locked design files in the design library or when one of the first and second processes is dead;

code for unlocking the corresponding locked design files in the design library based on deleting the corresponding process identification file; and code for unlocking the master lock file.

19. The non-transitory computer-readable medium of claim 18, further comprising:

code for removing a set of corresponding entries in the lock table based on unlocking the corresponding locked design files in the design library.

20. The non-transitory computer-readable medium of claim 14, further comprising:

code for moving the lock table from the common memory in the first computer to the process memory of the first process based on the second process in the first computer unlocking all used design files in the design library.

21. The non-transitory computer-readable medium of claim 14, further comprising:

code for moving the lock table from the design library to the memory of the first computer based on the process in the second computer in the plurality of computers unlocking all used design files in the design library.

22. The non-transitory computer-readable medium of claim 14, further comprising:

code for copying the lock table to the process memory of active processes as a local cache of the lock table.

23. A system for managing design files, the system comprising:

a processor; and a memory storing a set of instructions which when execute by the processor configured the processor to:

create a lock table, wherein each entry of the lock table comprises information regarding which design file of a plurality of design files of an integrated circuit, shared by multiple processes of a plurality of computers and stored in a design library of a server accessible to each of a plurality of the computers, is locked by which process, wherein each of the plurality of design files represents a portion of a design of the integrated circuit, is locked by which process, wherein the lock table is created in a process memory of a first process in a first computer in the plurality of computers when the information indicates that the design files in the design library are accessed only by the first process in the first computer;

move the lock table from the process memory of the first process to a common memory in the first computer in response to (i) information indicating that one of the design files in the design library is to be locked by a second process of the first computer, the common memory accessible to both the first and second processes, and (ii) determining that the design files in the design library are being accessed by the first and second processes in the first computer; and move the lock table from the process memory of the first process in the first computer to the design library in response to (i) information indicating that one of the design files in the design library is to be locked by a process in a second computer different than the first computer and (ii) determining that the design files in the design library are being accessed by the first process in the first computer and the process in the second computer.

\* \* \* \* \*

UNITED STATES PATENT AND TRADEMARK OFFICE
CERTIFICATE OF CORRECTION

PATENT NO. : 9,575,986 B2  
APPLICATION NO. : 13/873604  
DATED : February 21, 2017  
INVENTOR(S) : Doig et al.

Page 1 of 1

It is certified that error appears in the above-identified patent and that said Letters Patent is hereby corrected as shown below:

On the Title Page

Item (72), delete: "Robert Doig, San Jose, CA (US);  
Jen-Feng Huang, Hsinchu, CA (US);  
Vincent Hsu, Hsinchu (TW);  
Wei-Cheng Chen, Hsinchu (TW)"

Insert:  
--(72) Inventors: Robert Doig, San Jose, CA (US);  
Jen-Feng Huang, Hsinchu (TW);  
Vincent Hsu, Hsinchu (TW);  
Wei-Cheng Chen, Hsinchu (TW)--

Signed and Sealed this  
Thirteenth Day of June, 2017

Joseph Matal  
*Performing the Functions and Duties of the*  
*Under Secretary of Commerce for Intellectual Property and*  
*Director of the United States Patent and Trademark Office*